Patented Nov. 7, 1939

2,179,218

UNITED STATES PATENT OFFICE 2,179,218

1,1,1-TRICHLOROPROPANE AND METHOD OF PREPARATION

Arthur A. Levine and Oliver W. Cass, Niagara Falls, N. Y., assignors to E. I. du Pont de Nemours & Company, Wilmington, Del., a corporation of Delaware No Drawing. Application March 8, 1937, Serial No. 129,683

4 Claims. (Cl. 260—658)

This application relates to the preparation of novel and valuable compounds by treatment of 1,1-dichloropropene-1, $CCl_2=CH.CH_3$. More particularly, it relates to the preparation of 1,1,1-trichloropropane, $CCl_3.CH_2.CH_3$, (ethyl chloroform) by causing 1,1-dichloropropene-1 to react with hydrogen chloride in the presence of a small amount of aluminum chloride.

The unsaturated compound 1,1-dichloropropene-1, $CCl_2=CH.CH_3$, is readily prepared from saturated starting materials. One method of preparing this compound is disclosed in our copending application, Serial No. 21,300, filed May 13, 1935.

It is one of the objects of this invention to react hydrogen chloride with 1,1-dichloropropene-1 under conditions whereby valuable products will result. A more specific object of this invention is the preparation of the new compound 1,1,1-trichloropropane, having the formula

$CCl_3.CH_2CH_3$ from the dichloropropene starting material. The new compound, which is also termed "ethyl chloroform", (the formula for chloroform being $CCl_3.H$), is non-flammable and has valuable solvent properties for oil and grease.

Although a product supposed to be ethyl chloroform has been mentioned in the literature (see Beilstein, volume 1, page 106) it is obvious from the boiling point given that the compound prepared was not 1,1,1-trichloropropane. This has been recognized by other chemists (see Chem. Abstracts, volume 27, page 641 (1933)).

In carrying out our invention, a reaction vessel fitted with a stirrer, thermometer and reflux, is charged with the quantity of 1,1-dichloropropene-1 which it is desired to react. The chloropropene is then saturated with hydrogen chloride gas. A small amount of the catalyst, anhydrous aluminum chloride, is then added while the addition of hydrogen chloride is continued. As soon as the temperature begins to rise, the flask and its contents are cooled rapidly and further amounts of aluminum chloride are added as needed to cause complete absorption of the hydrogen chloride. During this period the temperature should preferably be kept at 5 to 10° C. and the aluminum chloride should be added in successive small amounts.

When hydrogen chloride gas appears at the outlet of the scrubber the reaction is substantially complete. The reaction mixture may then be removed from the reaction vessel, washed with water, and dried. Upon distillation, through a three foot column, fractions may be collected having the following boiling points:

Fraction A _____ Below 85° C.
Fraction B _____ 85 to 106° C.
Fraction C _____ 106 to 107° C.
Fraction D _____ Residual material, boiling above 107° C.

Fraction C is substantially pure ethyl chloroform, 1,1,1-trichloropropane. Soda ash may then be added to the ethyl chloroform fraction, in order to remove any residual hydrogen chloride present therein.

As an example of our novel process of reacting dichloropropene with hydrogen chloride in the presence of aluminum chloride, it may be noted that the above general procedure was carried out utilizing the amounts of reagents specified in the following summary:

Example

A one liter flask was charged with 227 grams of 1,1-dichloropropene-1. Its contents were then saturated with hydrogen chloride, generated by reacting in a hydrogen chloride generator, ammonium chloride and sulfuric acid. A small amount of aluminum chloride was then added to the reaction mixture whereupon a rise in temperature was noted. The flask and its contents were then cooled rapidly to a temperature of 5 to 10° C. utilizing an ice bath. While maintaining the temperature at about 5 to 10° C. and continuously passing hydrogen chloride into the reaction mixture, further amounts of aluminum chloride were added in successive small increments until about 2.5 grams of the catalyst had been introduced. During the entire process the stirrer was operated so that the reactants were brought into intimate contact with each other and with the aluminum chloride.

At the end of 45 minutes, gaseous hydrogen chloride was observed to be passing into the scrubber which was attached to the one liter flask. The reaction was then complete and the reaction mixture was removed from the flask. After washing with water and drying the washed product by contacting it with calcium chloride the reaction product was subjected to fractional distillation. A three foot column was used in the distillation and fractions were collected as follows:

Fraction A _____ Boiling point below 85° C.
Fraction B _____ Boiling point 85 to 106° C.
Fraction C _____ Boiling point 106 to 107° C.
Fraction D _____ Residue, boiling over 107° C.

In the process in which 227 grams of 1,1-dichloropropene-1 were reacted with 42 grams of hydrogen chloride in the presence of 2.5 grams of aluminum chloride, Fraction C, the ethyl chloroform fraction, after drying and freeing from residual hydrogen chloride by treatment with soda ash, amounted to about 103 grams. The new product had a density of 1.287 at 23° C. compared with water at 4° C., and was a substantially colorless liquid having a pungent odor.

By carrying out other experimental trials and carefully controlling the conditions under which the reaction is carried out, in accordance with the procedure hereinbefore specified, it is possible to secure yields of ethyl chloroform which are substantially greater in amount, based on the amount of dichloropropene starting material utilized, than the yield given in the table. That the ethyl chloroform product having a density of 1.287 at 23° C. compared with water at 4° C. is a new chemical compound is apparent from the following data.

A chlorine determination, carried out utilizing a small amount of the product, in accordance with the Liebig method, gave a chlorine percentage of 72.1%. The Liebig method involves passing a weighed amount of the vaporized product through a tube filled with calcium oxide heated to red heat by means of a furnace or a series of Bunsen burners. The chlorine content of the product is absorbed in the lime and is determined by titration. This is accomplished by dissolving the contents of the tube in dilute nitric acid and then determining quantitatively the amount of calcium chloride present in the lime by titrating with silver nitrate.

It is obvious from the formula of ethyl chloroform, $CCl_3.CH_2.CH_3$, that the theoretical percentage of chlorine in this compound is 72.3%. Since the observed value was 72.1% it is obvious that the product subjected to analysis in order to determine its chlorine content, in accordance with the Liebig method, must have been ethyl chloroform.

Two molecular weight determinations in accordance with the Victor Meyer method were also carried out. This method is well known to chemists and is described in elementary textbooks. It involves determination of the volume of vapor produced from a known weight of the substance, from which the molecular weight can be calculated in accordance with known constants.

The two determinations of the molecular weight of Fraction C, after that fraction had been dried and treated with soda ash, gave respectively the values 145.8 and 146.0. Since the theoretical molecular weight is 147.5 it is obvious that Fraction C, boiling at 106 to 107° C., was substantially pure ethyl chloroform.

In its broadest aspects this invention involves the preparation of 1,1,1-trichloropropane (ethyl chloroform) from 1,1-dichloropropene-1. Since various changes may be made in the procedure specified or in the conditions under which the chemical reaction is carried out, which would still come within the scope of our invention, it is our desire that the scope of the invention be not restricted, except as necessitated by the appended claims or prior art.

We claim:

1. A process of preparing an isomer of trichloropropane having an atmospheric boiling point of 106-107° C. which comprises reacting hydrogen chloride and 1,1-dichloropropene-1.

2. A process of preparing an isomer of trichloropropane having an atmospheric boiling point of 106-107° C. which comprises reacting hydrogen chloride and 1,1-dichloropropene-1 in the presence of a small amount of aluminum chloride.

3. A process of preparing an isomer of trichloropropane having an atmospheric boiling point of 106-107° C. which comprises reacting hydrogen chloride and 1,1-dichloropropene-1 in the presence of a small amount of aluminum chloride and then fractionating the resulting product in order to obtain a substantially pure product boiling at 106 to 107° C.

4. As a new compound, an isomer of trichloropropane, said compound being a liquid having a boiling point at atmospheric pressure of 106 to 107° C., and a density at 23° C. of 1.287 as compared with water at 4° C.

ARTHUR A. LEVINE.
OLIVER W. CASS.